J. C. COLE.
TIRE HOLDER.
APPLICATION FILED MAY 25, 1910.
1,032,659.
Patented July 16, 1912.
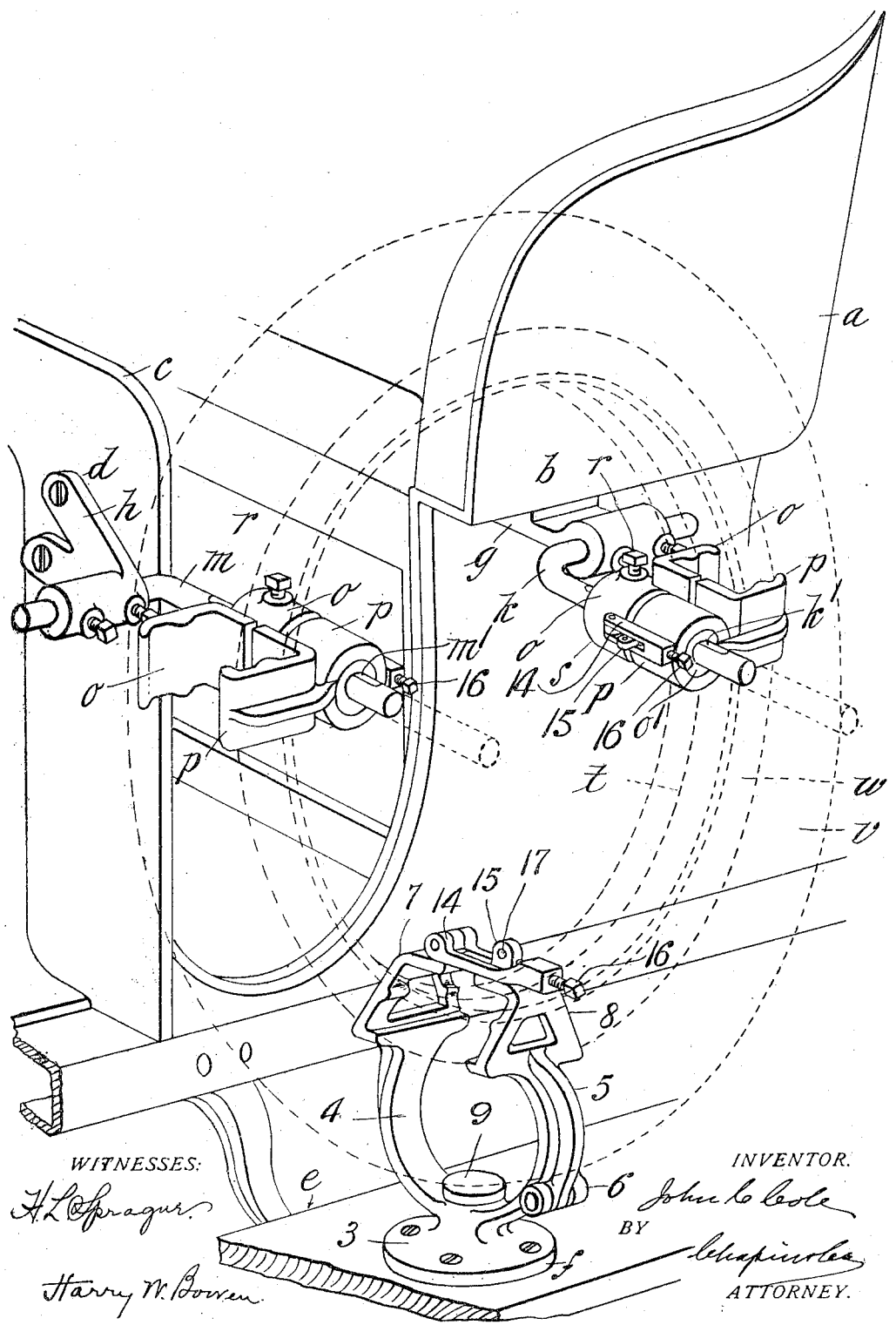
WITNESSES:
H. L. Sprague.
Harry W. Bowen.
INVENTOR.
John C. Cole
BY
ATTORNEY.

UNITED STATES PATENT OFFICE.

JOHN CLARENCE COLE, OF CHICOPEE FALLS, MASSACHUSETTS, ASSIGNOR TO THE FISK RUBBER COMPANY, OF CHICOPEE FALLS, MASSACHUSETTS, A CORPORATION OF DELAWARE.

TIRE-HOLDER.

1,032,659.  Specification of Letters Patent.  Patented July 16, 1912.

Application filed May 25, 1910. Serial No. 563,248.

*To all whom it may concern:*

Be it known that I, JOHN C. COLE, a citizen of the United States of America, residing at Chicopee Falls, in the county of Hampden and State of Massachusetts, have invented new and useful Improvements in Tire-Holders, of which the following is a specification.

This invention relates to devices for holding spare tires which are generally carried on self-propelled road vehicles, the object of the invention being to provide a structure adapted especially to carry one or more pneumatic or other tires, together with the metal rims on which they are mounted.

At the present time the use of demountable rims for automobiles is quite general; and, as is well known, the tires, inflated, are mounted on these rims, which adds quite an additional weight to be carried, and the tire-holders, as at present generally constructed, are not adapted to securely hold the spare tires of this type rigidly enough to prevent considerable play of the tire in the holders when the vehicle is in use, and the result is that the tires chafe and the tire-holders work loose.

The present invention provides means to rigidly lock the tires by means of engagement with the rims thereof of suitable locking devices associated with the holders, and as these rims are very rigid all movement of the tires in the holders is avoided.

In the drawings the holder is shown adapted to receive one tire only, the general construction being described farther on.

The figure of the drawings is a perspective view showing a portion of the vehicle to which the tire-holder is secured, and is of that type arranged to receive but one tire.

Referring to the drawings, $a$ indicates a portion of the body of an automobile to which the various fixtures embodying the invention are attached. These fixtures are three in number and are attached respectively to the body of the vehicle at $b$, to the dash-board $c$, as at $d$, and to the running-board $e$, as at $f$. The two fixtures attached respectively to the body and the dash-board are secured thereto by means of supports or brackets, indicated respectively by $g$ and $h$, in which are secured adjustable arms $k$ and $m$. These arms are secured in their brackets by set-screws or other suitable means, by one end thereof, their opposite ends extending out horizontally at right angles to the side of the vehicle-body; and on these last-named portions of said arms are secured clamping jaws consisting of two parts $o$ and $p$,—in the parts $o$ being removably secured to the arms by means of set-screws $r$, preferably. The part $o$ is turned down at one end to a smaller diameter for a distance equal to, or a little longer than, the part $p$ to constitute a sleeve $o^1$ on which the part $p$ may slide toward and from the part $o$. Preferably the parts $o$ have a spline and groove connection with the arms $k$ and $m$, the groove only being shown and indicated by $k^1$ and $m^1$ respectively, in the two arms. The use of the sleeve $o^1$ greatly strengthens the arms $k$ and $m$ and prevents the bending thereof by the strain put on them when the clamping device is tightened. This clamping device is applied to the two parts $o$ and $p$ whereby after the sliding member, as $p$, has been moved toward the member $o$ into position to grasp the rim $t$ of the tire $v$, said sliding part $p$ may be drawn up toward the part $o$ and into tight engagement with said rim.

The tire and rim in the figure of the drawings are shown in dotted lines only.

In the tire shown in the drawings, the type illustrated is that known as the "bolted on" type and is provided with the rectangularly shaped flanged edge $w$ which is engaged by the jaws $o$ and $p$, and the configuration of the jaws is such as is adapted to the particular shape of this tire-flange.

If the tire-holders are to be used for a clencher-type of tire, the configuration of the jaw will be slightly different to conform to the edge of the rim on which that kind of a tire would be mounted.

Located on the running-board $e$ of the vehicle is another fixture adapted to engage the tire $v$, and it consists of a suitable base 3 on which is a rigid arm 4 of a curved form to adapt it to the external shape of the tire $v$, and a similar oppositely disposed arm 5 which is hinged on the base at 6 in such manner as to permit it to swing outwardly. The free ends of these two arms 4 and 5 are provided with jaws 7 and 8 adapted to grasp the rim $t$, and the flange $w$ of the tire in the same manner that the fixtures on the body and dash-board grasp these parts, the clamping device 10 to hold these jaws against the rim $w$ being similar to the device referred to above as applied to the parts $o$ and $p$.

Preferably, a cushion or pad 9 of some soft material is applied to the base 3 to support the tire out of contact with the metal holder. This feature is common to most tire-holders and prevents the chafing of the tire which would take place, if it rested on metal.

When it is desired to carry more than one tire, the arms $k$ and $m$ and the sleeve $o^1$ of the part $o$ would be made enough longer than shown in the figure to permit the jaws $o$ and $p$ to be separated sufficiently to grasp the outer edges of the rims of two tires placed side by side, and the fixture secured to the running-board would, in that case, be made wide enough for two tires, this fixture being the only one in which a slight change is required to enable the two tires to be mounted therein and easily removed therefrom.

The locking device referred to above as applied to the parts $o$ and $p$ and to the fixture carried on the running-board consists of a yoke 14 pivotally supported on one of the members of each of the fixtures above referred to, as $o$ for example, on the fixtures attached to the body and the dash-board, and the jaw 7 of the fixture attached to the running-board. This yoke swings down over the end of an abutment 15 on the opposite member of the clamping device, as shown, there being a screw 16 extending through the end of the yoke and adapted to bear against the abutment 15.

By screwing up on the bolts 16, it is possible to very tightly grip the rim of the wheel carried on the fixtures regardless of the type of the rim on which the tire may be mounted, and by gripping the rims and flanges by their edges, it is unnecessary that the rim seat should have any bearing on the clamping devices. Furthermore, this type of locking device makes it possible to secure the same against surreptitious opening thereof by drilling a hole 17 through the abutment 15 and passing a tongue of a padlock through the hole.

By the use of the tire-holders shown and described herein, the tires are supported by their rims and the cushions 9 are of little practical value except as they serve to prevent any friction between the surface of the tire where it passes through the holder on the running-board, and the top of the base 3 of that holder. Such friction might take place owing to the vibration of the running-board, if there were contact between the tire and that holder, even though the weight of the tire were supported by the clamping jaws of the various fixtures above described.

While the holders herein described are especially adapted to the tires and demountable rims described, they may be used to carry tires not mounted on the rims, as the beaded edges of the pneumatic tires in general use are sufficiently rigid to withstand the clamping action of the jaws $o$ and $p$ or 7 and 8.

What I claim, is:—

1. A tire-holder consisting of supports secured to a vehicle in suitably spaced relation one with another and extending away from the vehicle, and clamping devices on said supports each comprising a pair of jaws adapted to grip the inner periphery of the tire only, and means to adjust each of said jaws one relative to the other and both relative to the vehicle body, together with a yoke on one jaw having a swinging movement into engagement with the other jaw, and a locking device operable to lock the yoke in engagement with the jaws and simultaneously to tighten the grip of the jaws on the tire.

2. A tire-holder consisting of supports secured to a vehicle in suitably spaced relation, gripping jaws on said supports to grip the opposite edges of the inner periphery of a tire, one of said jaws being provided with a projection, and a yoke on the opposite jaw to couple said jaws together, and a screw in the yoke to bear on said projection to lock said yoke in operative position and simultaneously to tighten the grip of the jaws on the tire.

JOHN CLARENCE COLE.

Witnesses:
WM. H. CHAPIN,
HARRY W. BOWEN.